United States Patent

[11] 3,595,292

[72] Inventor Anton Muller
 Unterkochen, Germany
[21] Appl. No. 715,007
[22] Filed Mar. 21, 1968
[45] Patented July 27, 1971
[73] Assignee Eisen-und Drahtwerk Erlau A.G.
 Aalen Wurtt, Germany
[32] Priority Mar. 23, 1967
[33] Germany
[31] E 33671

[54] CONNECTING LINK FOR TIRE CHAINS
 13 Claims, 22 Drawing Figs.
[52] U.S. Cl........................................................ 152/243
[51] Int. Cl......................................................... B60c 11/00
[50] Field of Search........................................... 152/243,
 239, 244, 245; 59/85

[56] References Cited
 UNITED STATES PATENTS
 271,141 1/1883 Simons et al.................. 59/85

| 649,460 | 5/1900 | Jordan........................... | 59/85 X |
| 1,776,515 | 9/1930 | Leahy et al.................. | 59/85 |
| 2,480,788 | 8/1949 | St. Pierre...................... | 152/245 UX |
| 3,429,353 | 2/1969 | Schurle et al................. | 152/243 |

FOREIGN PATENTS

| 910,342 | 1/1946 | France........................... | 59/85 |
| 1,090,530 | 10/1960 | Germany...................... | 152/243 |
| 48,042 | 6/1930 | Norway......................... | 152/239 |

Primary Examiner—Joseph R. Leclair
Assistant Examiner—James R. Garrett
Attorney—Walter Becker ABSTRACT: A connecting link for tire chains provided with an opening for receiving at least one other chain link, which includes a closing bolt selectively movable in its longitudinal direction for selectively opening and blocking said opening to permit insertion and withdrawal of another chain link and preventing withdrawal of such inserted chain link.

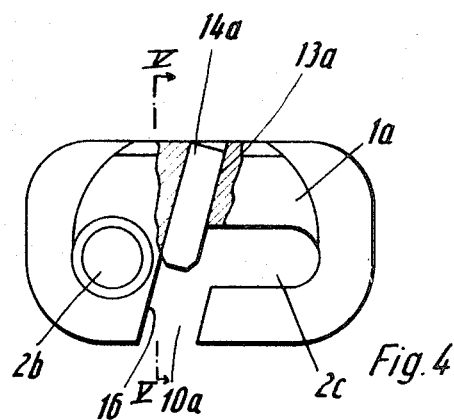
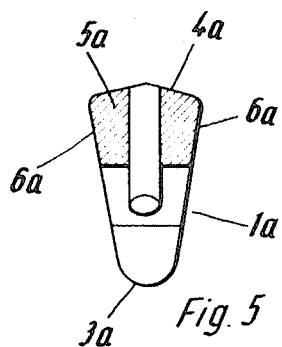
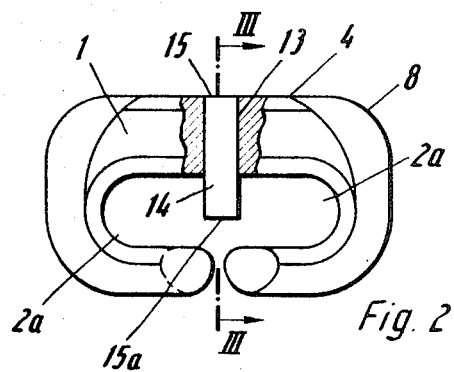
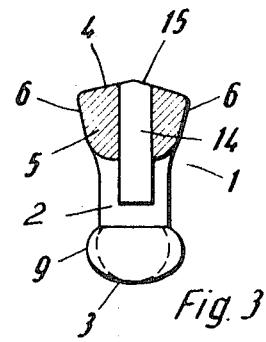
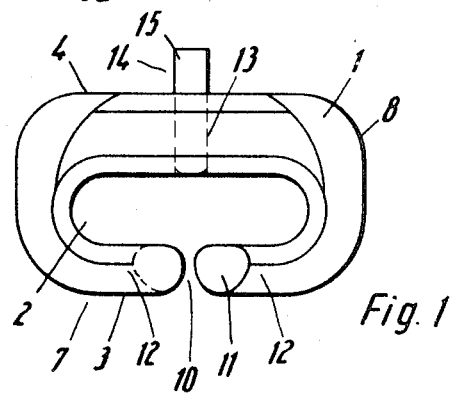
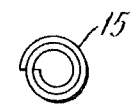

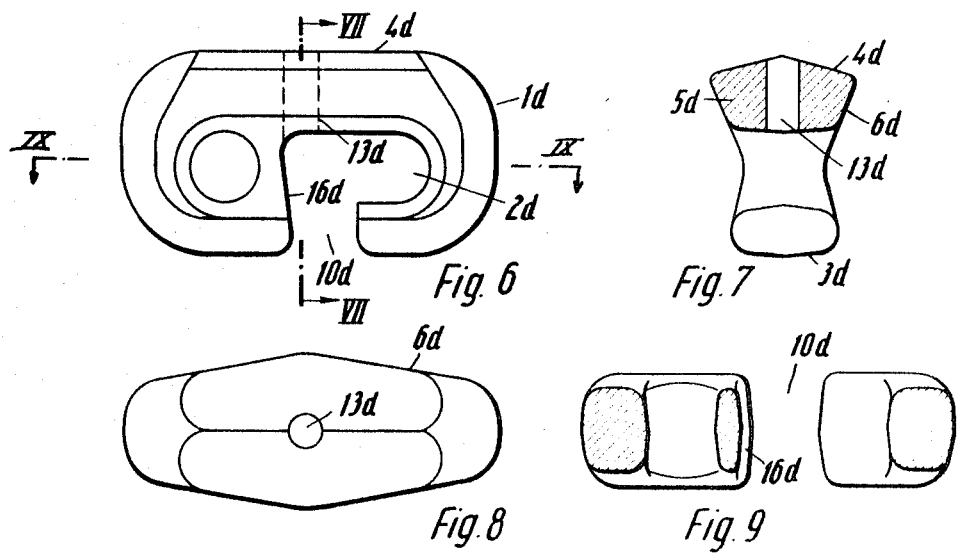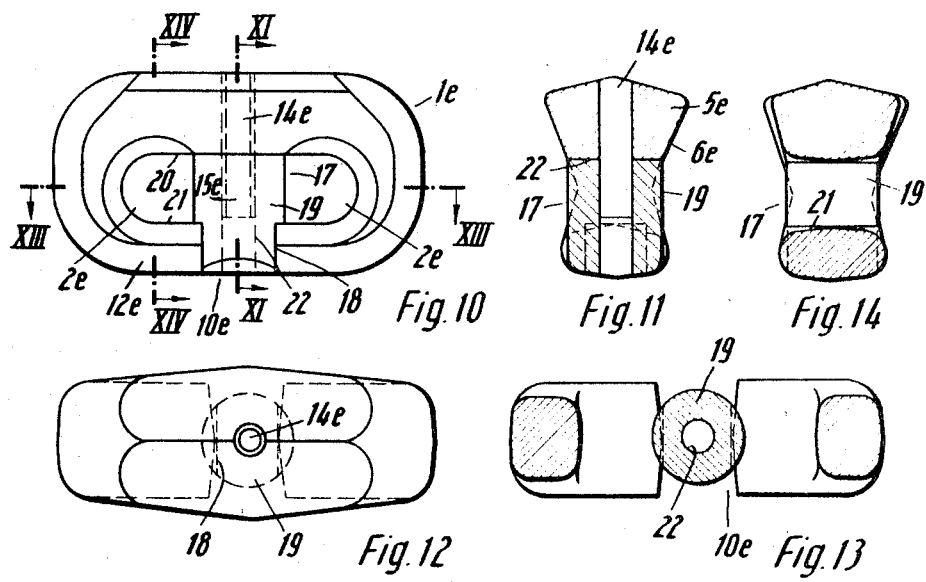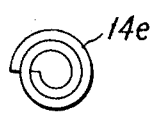

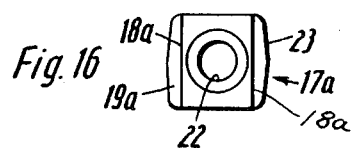
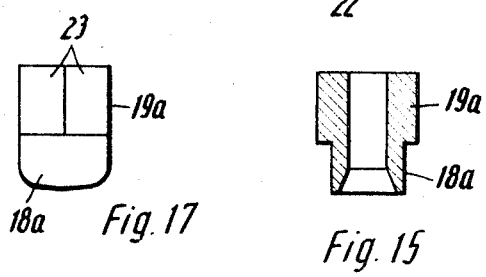
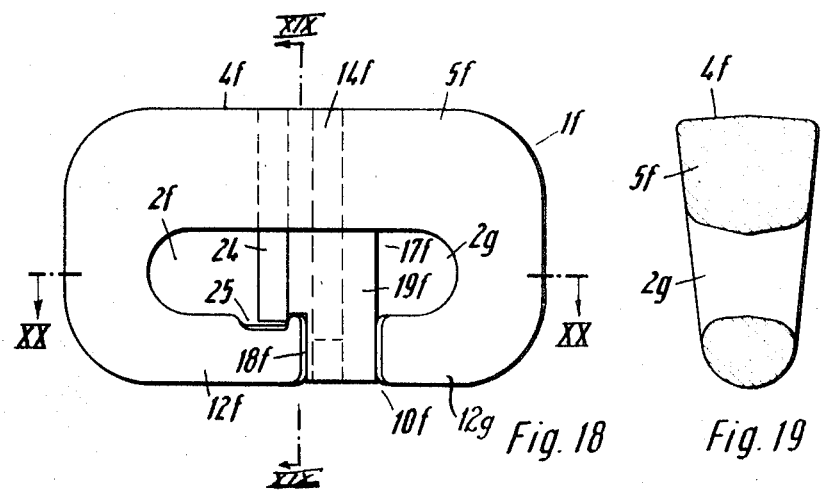

CONNECTING LINK FOR TIRE CHAINS

The present invention relates to a connecting link for tire chains with openings for receiving adjacent chain links, at least one of said openings comprising an outwardly leading suspension opening.

In tire-protective chains, as a rule, a plurality of double hooks or connecting hooks are employed which establish the connection at the individual joint abutments or junction points, especially of the main portion of the chain to the side portion thereof, and from the side portion of the chain to the side chain. Connecting links of this type are also employed as replacement parts or repair links which can be employed at damaged portions of the tire chain. Heretofore-known connecting links of the type involved are provided with screws, rivets, welding connections, or the like for securing the same as to position in the chain construction. The drawback of these connecting links consists in that they have only a relatively short life while being expensive to produce. Moreover, they are frequently difficult to assemble and disassemble.

It is an object of the present invention to provide a connecting link of the above-mentioned general type which will be simple in construction and can be produced at low cost.

It is another object of this invention to provide a connecting link as set forth in the preceding paragraph which can easily be assembled on a tire chain and also can easily be disassembled therefrom.

These and other objects and advantages of the invention will appear more clearly from the following specification in connection with the accompanying drawings, in which:

FIG. 1 diagrammatically illustrates a view of a connecting link according to the present invention in its open position;

FIG. 1a shows an end view of a spiral form of locking pin 15 on an enlarged scale.

FIG. 2 shows the connecting link of FIG. 1 in its closed position;

FIG. 3 is a cross section taken along line III–III of FIG. 2;

FIG. 4 is a modified connecting link according to the invention;

FIG. 5 is a cross section of FIG. 4 taken along the line V–V of FIG. 4;

FIG. 6 is a side view of a further connecting link according to the invention;

FIG. 7 is a section taken along the line VII–VII of FIG. 6;

FIG. 8 is a top view of the connecting link of FIG. 6;

FIG. 9 is a longitudinal section along the line IX–IX of FIG. 6;

FIG. 10 represents a still further modification of a connecting link according to the invention;

FIG. 11 is a cross section taken along the line XI–XI of FIG. 10;

FIG. 12 is a top view of FIG. 10;

FIG. 12a shows an end view of the spiral form locking pin 14e on an enlarged scale.

FIG. 13 is a section taken along the line XIII–XIII of FIG. 10;

FIG. 14 is a section along the line XIV–XIV of FIG. 10;

FIG. 15 is a cross section through an insert member according to the present invention;

FIG. 16 is a bottom view of the insert member of FIG. 15;

FIG. 17 is a side view of the insert member of FIG. 15;

FIG. 18 is a side view of still another connecting member according to the present invention;

FIG. 19 is a cross section along the line XIX–XIX of FIG. 18; and

FIG. 20 is a longitudinal section along the line XX–XX of FIG. 18.

With a connecting link for tire chains provided with openings for receiving adjacent chain links, of which openings at least one comprises an outwardly leading suspension opening, according to this invention, a closing bolt is longitudinally movably mounted in said chain link. Said closing bolt is adapted to move into a first position in which it closes the suspension opening, and is also movable into a second position in which it frees said suspension opening. In this way the connecting link is simple to operate and will assure a safe mounting of this link and the link chains of a tire chain which are connected with said link.

According to a particularly advantageous embodiment of the present invention, the closing bolt consists of a pin which is displaceable in a bore, preferably a spiral dual-wound resilient hull configuration, heavy clamping, or notch pin, which can be moved in a simple manner by a linear displacement into its closing position or out of said closing position. The closing pin can be moved into its closing position by a hammer without the employment of special tools.

According to a further feature of the invention, the invention, bolt is mounted so as to be movable substantially parallel to the plane of the connecting link so that the bolt is safely guided over a relatively large length in the connecting link and cannot be damaged because it does not laterally protrude beyond the connecting link. This structure will even further be improved when the closing bolt is located transverse, preferably vertical, to the running surface of the connecting link.

In order to be able easily to withdraw the closing bolt, its length is less than the extension of the connecting link in the longitudinal direction thereof minus the length of the guiding means for the closing bolt, so that the closing bolt can be moved in its closing direction to such an extent that it will disengage with the guiding means therefore on the connecting link whereby it is detached from the connecting link. This operation, according to which the closing bolt expediently moves through the suspension opening, can be carried out by the design of the connecting link according to the invention also with a tire chain placed on a vehicle tire, without possible damage to the tire.

A particularly high strength of the connecting link will be assured when the latter is designed as a web member and when at least one side forms a hook in the opening of which the closing bolt is movable. The receiving opening of the connecting link may be in the form of a passage which is closed over its entire circumference in such a way that the connecting link is nondetachably connected to a chin link arranged in said passage.

According to another advantageous embodiment of the present invention, the connecting link has a single, preferably oblong passage therethrough which at one side is provided with a suspension opening. The said suspension opening is advantageously arranged symmetrically to the longitudinal central plane of the connecting link, preferably in that portion thereof which comprises the tire-engaging surface. In this way, that side of the connecting link which in view of the suspension opening is weakened as to its wear volume is exposed only to a rather light wear when the connecting link is employed.

The safety with which the links to be connected and suspended on the connecting link are held on said connecting link, can be further increased when those surfaces of the legs of the connecting link, which legs extend toward each other and form the suspension opening, are located at an incline with regard to the plane of the connecting link and are preferably approximately perpendicular to the running plane.

According to still another embodiment of the invention, the closing bolt in that portion of the connecting link which comprises the running surface is located approximately in the longitudinal central plane of said connecting link. In view of this design, the closing bolt will wear to the same extent as the running side of the connecting link so that it will become nonusable only when also the connecting link has worn till it has become unusable.

The strength at which the closing bolt secures the chain links interconnected by said connecting link, relative to the connecting link may with relatively small dimensions of the closing bolt, be of considerable magnitude when the closing bolt in its closing position is approximately over its entire length supported at one side.

In order to be able to move the closing bolt in a simple manner into and out of its closing position, the recess or cutout for receiving the closing bolt in the connecting link is designed as a passage so that for purposes of withdrawing the closing bolt, which may be designed in the form of a pin, it is merely necessary by means of a hammer to knock the closing bolt out of the passage.

Referring now to the drawings in detail, FIGS. 1—3 illustrate a connecting link 1 according to the invention in the form of a substantially plane web member which has an oblong receiving opening 2 for chain links to be suspended therein. The opening 2 is eccentrically located with regard to the crowned tire-engaging surface 3.

The web portion 5 of the connecting link 1, which web portion comprises the running surface 4 of roof-shaped cross-sectional configuration, is substantially trapezoidal in cross section so that its lateral surfaces 6 taper toward each other at an acute angle in the direction toward the opening 2 or tire-engaging surface 3. Due to the fact that the receiving opening 2 is eccentrically located in the connecting link 1, the web portion 5 which comprises the running surface 4 has a greater height than the web portion 7 comprising the tire-engaging surface. The lateral surfaces 9 of said web portion 7 are likewise of a spherical design so that the web portion 7 has an approximately elliptical or oval cross section. The corner areas 8 of the substantially rectangular connecting link 1 are rounded over approximately a quarter of a circle.

As will furthermore be evident from FIG. 1, a suspension opening 10 is provided symmetrically with regard to the longitudinal central plane of the web portion 7 which comprises the tire-engaging surface 3. The said opening 10 is formed by an interruption or break in the web portion 7 by a two-sectional design of said web portion 7. The end faces 11 which face each other and pertain to the two web legs 12 which extend freely toward each other are located in planes parallel to each other and inclined to the plane of the connecting link 1 while being approximately perpendicular to the running surface of link 1.

In the longitudinal central plane of the web portion 5 which pertains to the link 1 and comprises the running surface 4 there is provided a bore 13 which is perpendicular to the running surface and in which a closing pin 14 is displaceably guided by a press fit. The longitudinal axis of the closing pin 14 or the bore 13 extends symmetrically through the center of the suspension opening 10, said suspension opening 10 being in excess of the diameter of the closing pin 14.

In its starting position, the rear end 15 of the closing pin 14 protrudes beyond the running surface 4 of the connecting link 1 in such a way that the front end of the closing pin 14 is located outside the receiving opening 2 of the connecting link 1. After the chain links to be connected to each other have been introduced through opening 10 into the receiving opening 2 of the connecting link 1, the closing pin 14 is by means of hammer blows upon its rear end 15 (see FIG. 2) driven into the receiving opening 2 so that two individual receiving openings 2a separate from each other will be formed from which the chain links (not shown) cannot detach themselves because the distance of the front end 15a of the closing pin 14 from the web legs 12 is less than the corresponding cross section of the suspended chain links. In its closing position, the rear end 15 is flush with the running surface 4 of the connecting link 1.

For purposes of removing the closing pin 14 from its closing position according to FIGS. 2 and 3, the closing pin 14 is knocked through the passage 13 and opening 10 so that the chain links suspended in the connecting link 1 can be detached from the connecting link 1. The thus removed closing pin 14 can from the running surface 4 of connecting link 1 again be inserted in the bore provided for receiving pin 14. Since the pin 14 (as shown in FIG. 3) is located within the plane of the web-shaped connecting link 1, damage to the closing pin 14 when employing the connecting link is practically impossible.

According to the embodiment illustrated in FIGS. 4 and 5, the lateral surfaces 6a of the connecting link 1a are inclined toward each other over the entire height of link 1a while the tire-engaging surface 3a is likewise crowned. The web-shaped connecting link 1a has one side thereof provided with a passage 2b which extends through the connecting link 1a for receiving a chain link, whereas the other side of link 1a has an oblong opening 2c into which leads a suspension opening 10a located approximately in the longitudinal central plane of the connecting link 1a. The suspension opening 10a is in the longitudinal direction of the connecting link 1a slightly inclined to the running surface of said link 1a. The web portion 5a which comprises the running surface 4a of link 1a has a bore 13a therein which is inclined in conformity with the inclination of the suspension opening 10a. A closing pin 14a is with press fit displaceably guided in passage 13a in such a way that the connection between the receiving opening 2c and the suspension opening 10a can be closed to such an extent that a chain link suspended in the opening 2c can no longer be removed therefrom under normal circumstances. On that side of the bore 14a which extends toward the opening 2b, the connecting link 1a has a supporting surface 16 against which the closing pin 14a will rest in any position, so that the closing pin 14a at this side is safely supported over its entire length. According to the embodiment of FIGS. 4 and 5, a simple hook member is provided in which the hook is formed by the wall defining the opening 2c and the suspension opening 10a.

FIGS. 6—9 likewise illustrate a simple hook member 1d. The suspension opening 10a has that side which faces away from the hook provided with an inclined surface 16d. This surface 16d, in contrast to the embodiment of FIG. 4, is inclined toward the free end of the hook. The passage or bore 13d for receiving the closing pin is perpendicular to the running surface 4d of the connecting link so that the closing pin is able to have its free end which is located in the receiving opening 2d abut the inclined surface 16d. In this connection the closing pin may after engaging the inclined surface 16d be further advanced in the bore 13d so that the free end of the closing pin which is located in the opening 2d or the opening 10d is bent approximately parallel to the surface 16d and closes the opening 10d.

As will be seen from FIG. 7, the hook member 1d has a double trapezoidal cross section while the running surface 4d has a greater width than the tire-engaging surface 3d, and while the lateral surfaces 6d extend at an acute angle inclined toward each other approximately toward the center of the opening 2d. The web portion 5d which comprises the ground-engaging surface 4d has a substantially trapezoidal cross section while the ground-engaging surface 4d is formed by two individual surfaces which form an obtuse angle with each other and are located symmetrically with regard to the central vertical plane of the link. The web portion which comprises the tire-engaging surface 3d has an oval cross section.

As will be seen from FIGS. 8 and 9, the web portion 5d is widest approximately within the area of the center of its longitudinal extension. The lateral surfaces 6d taper toward each other from said widest portion to the ends of the link. The web portion which comprises the tire-engaging surface 3d, in conformity with FIG. 9, has the same width over its entire length.

The double hook link 1e according to FIGS. 10—14 corresponds in cross section approximately to the embodiment illustrated in FIGS. 6—9. The front end 15e of the closing pin 14e which is arranged perpendicularly to the running surface in the central portion of the link has connected thereto an insert member 17 by means of which the link opening is divided into two individual separate receiving openings 2e. The insert member 17 is formed primarily by a cylindrical member one end of which comprises two oppositely located parallel plane flattened surfaces 18 which are spaced from each other by a distance corresponding to the minimum distance of the web legs 12e from each other, i.e. the smallest width of the suspension opening 10e. The height of the section comprising the flattened portions 18 is slightly less than the height of the web legs 12e, whereas the height of the remaining cylindrical section 19 of the insert member 17 corresponds to the height of the link opening 2e. As a result, the insert member 17 can be introduced transversely to the plane of the connecting link 1e into the receiving opening 2e or the suspension opening 10e so that it will rest on the oppositely located inner surface 20, 21 of link 1e and its strength will be greatly increased. A bore 22 is provided which is located in the central axis of the insert member 17 and in which the closing pin 14e is located, preferably with press fit. As will be evident from FIGS. 11 and 14, the diameter of the cylindrical section 19 of the insert member 17 is slightly greater than the smallest width of the link so that the cylindrical section 19 slightly protrudes laterally beyond the lateral link surfaces 6e. The diameter of the cylindrical section 19 is so selected that it is approximately equal to the narrowest width of the web portion 5e. According to FIGS. 10—14, the closing pin is formed by a spiral dual-wound resilient hull pin 14e. The insert member 17 which may be clamped between the web legs 12e may also be designed in conformity with FIGS. 15—17. The insert member 17a of FIGS. 15— has a substantially rectangular plan view. The narrower section to the large arranged in the suspension opening 10e has two oppositely located parallel surfaces 18a. The wider section 19a of the insert member 17a which separates the individual openings 2e from each other and is of a substantially rectangular located section has those sides which are approximately parallel the longer the flattened portions 18a provided with inclined individual surfaces 23 defining an obtuse angle so that the lateral surfaces formed by said individual surfaces 23 are arched in a convex manner similar to the embodiment of FIG. 10. In this way an easy movability of the chain links to be suspended in the openings 2e will be assured.

The double hook member 1f according to FIGS. 18—20, likewise has two individual receiving openings 2F and 2g which are separated from each other by an insert member 17f, said opening being of different magnitude. The insert member 17f is formed primarily by a cylindrical part which has that section thereof which is located in the suspension opening 10f provided at one side with an axis parallel flattened portion 18f by means of which it engages the entire web leg 12f of the double hook member. The curved side of the insert member 17f which faces away from the flattened portion 18f engages the corresponding surface of the other web leg 12g which last-mentioned surface defines the suspension opening 10f. The insert member 17f is held by a pin 14f inserted into a longitudinal bore 22f. Pin 14f is held perpendicularly with regard to the running surface 4f in the web leg 5f comprising said running surface. Toward the large receiving opening 2f, and more specifically in the web portion 5f there is arranged a safety pin 24 which is parallel to the closing pin 14f and which extends into the link opening. The free end of safety pin 24 is located in a recess 25 on the inside of the longer web leg 12f. That portion of the safety pin 24 which is located in the link opening engages at least approximately the circumference of the wider section 19f of the insert member 17f.

It is, of course, to be understood, that the present invention is, by no means limited to the particular embodiments referred to above, but also comprises any modifications within the scope of the invention.

What I claim is:

1. A connecting link for tire chains, which comprises in combination: a tire-engaging section and an oppositely located ground-engaging section, that surface of said ground-engaging section which is located opposite to and faces away from said tire-engaging section forming the running surface of said connecting link, said ground-engaging section and said tire-engaging section being spaced from each other in the direction of the height of said connecting link and together defining a portion of an opening for receiving an additional chain link to be suspended in said opening, end sections respectively connecting the outer end portions of said ground-engaging section with the outer end portions of said tire-engaging section, and defining the remaining portions of said opening, said tire-engaging section having first passage means therethrough leading from the outside of said connecting link to said opening for permitting the introduction of an additional chain link into and the withdrawal thereof from said opening, said ground-engaging section having second passage means therethrough leading from the outside thereof to said opening, and pin means displaceably arranged in said second passage means and extending in the direction toward said tire-engaging section, said pin means being movable longitudinally selectively to a first position in which it blocks introduction of an additional link means into and its withdrawal from said opening and to a second position to permit introduction of an additional link means into and its withdrawal from said opening means, the inner wall surface of one of said end portions which define a part of said opening being inclined with regard to the outer surface of said tire engaging section for engagement with said pin means in said first position thereof.

2. A connecting link for tire chains, which comprises: a tire-engaging section and an oppositely located ground-engaging section, that surface of said ground-engaging section which is located opposite to and faces away from said tire-engaging section forming the running surface of said connecting link, said ground-engaging section and said tire-engaging section being spaced from each other in the direction of the height of said connecting link and together defining a portion of an opening for receiving an additional chain link to be suspended in said opening, end sections respectively connecting the outer end portions of said ground-engaging section with the outer end portions of said tire-engaging section, and defining the remaining portions of said opening, said tire-engaging section having first passage means therethrough leading from the outside of said connecting link to said opening for permitting the introduction of an additional chain link into and the withdrawal thereof from said opening, said ground-engaging section having second passage means therethrough leading from the outside thereof to said opening, and pin means displaceably arranged in said second passage means and extending in the direction toward said tire-engaging section, said pin means being movable selectively to a first position in which it blocks introduction of an additional link means into and its withdrawal from said opening and to a second position to permit introduction of an additional link means into and its withdrawal from said opening means, an insert member located in said first passage means and extending into said opening, said insert member being adapted to be detachably connected to said pin means, said insert member being of approximately rectangular cross section, and in which those surface portions of said insert member which are located in said opening and respectively face said end portions are each formed by two surface areas forming an obtuse angle with each other.

3. A connecting link for tire chains, which comprises: a tire-engaging section and an oppositely located ground-engaging section, that surface of said ground-engaging section which is located opposite to and faces away from said tire-engaging section forming the running surface of said connecting link, said ground-engaging section and said tire-engaging section being spaced from each other in the direction of the height of said connecting link and together defining a portion of an opening for receiving an additional chain link to be suspended in said opening, end sections respectively connecting the outer end portions of said ground-engaging section with the outer end portions of said tire-engaging section, and defining the remaining portions of said opening, said tire-engaging section having first passage means therethrough leading from the outside of said connecting link to said opening for permitting the introduction of an additional chain link into and the withdrawal thereof from said opening, said ground-engaging section having second passage means therethrough leading from the outside thereof to said opening, and pin means displaceably arranged in said second passage means and extending in the direction toward said tire-engaging section, said pin means being movable selectively to a first position in which it blocks introduction of an additional link means into and its withdrawal from said opening and to a second position to permit introduction of an additional link means into and its withdrawal from said opening means, an insert member located in said first passage means and extending into said opening, said insert member being adapted to be detachably connected to said pin means, said insert member being cylindrical and having two oppositely located flat surfaces within the area of said first passage means and spaced from each other in conformity with the width of said first passage means.

4. A connecting link for tire chains, which comprises: a tire-engaging section and an oppositely located ground-engaging section, that surface of said ground-engaging section which is located opposite to and faces away from said tire-engaging section forming the running surface of said connecting link, said ground-engaging section and said tire-engaging section being spaced from each other in the direction of the height of said connecting link and together defining a portion of an opening for receiving an additional chain link to be suspended in said opening, end sections respectively connecting the outer end portions of said ground-engaging section with the outer end portions of said tire-engaging section, and defining the remaining portions of said opening, said tire-engaging section having first passage means therethrough leading from the outside of said connecting link to said opening for permitting the introduction of an additional chain link into and the withdrawal thereof from said opening, said ground-engaging section having second passage means therethrough leading from the outside thereof to said opening, and pin means displaceably arranged in said second passage means and extending in the direction toward said tire-engaging section, said pin means being movable selectively to a first position in which it blocks introduction of an additional link means into and its withdrawal from said opening and to a second position to permit introduction of an additional link means into and its withdrawal from said opening means, an insert member located in said first passage means and extending into said opening, said insert member being adapted to be detachably connected to said pin means, said connecting link having an approximately double trapezoidal cross section and the widest extension of said insert member transverse to the longitudinal extension thereof corresponding to the narrowest portion of said double trapezoidal cross section.

5. A connecting link for tire chains, which comprises: a tire-engaging section and an oppositely located ground-engaging section, that surface of said ground-engaging section which is located opposite to and faces away from said tire-engaging section forming the running surface of said connecting link, said ground-engaging section and said tire-engaging section being spaced from each other in the direction of the height of said connecting link and together defining a portion of an opening for receiving an additional chain link to be suspended in said opening, end sections respectively connecting the outer end portions of said ground-engaging section with the outer end portions of said tire-engaging section, and defining the remaining portions of said opening, said tire-engaging section having first passage means therethrough leading from the outside of said connecting link to said opening for permitting the introduction of an additional chain link into and the withdrawal thereof from said opening, said ground-engaging section having second passage means therethrough leading from the outside thereof to said opening, and pin means displaceably arranged in said second passage means and extending in the direction toward said tire-engaging section, said pin means being movable selectively to a first position in which it blocks introduction of an additional link means into and its withdrawal from said opening and to a second position to permit introduction of an additional link means into and its withdrawal from said opening means, an insert member being located in said first passage means and extending into said opening, said insert member being adapted to be detachably connected to said pin means, said insert member having a wider portion located in said opening and engaging said ground-engaging section and also having a narrower portion arranged in said first passage means.

6. A connecting link according to claim 5, in which said connecting link has at least one end portion designed as hook forming said opening, said pin means being movable into said opening.

7. A connecting link according to claim 5, in which said opening is of an approximately oval shape with the ends thereof respectively defined by said end portions of said first passage means leading into said opening at an area between the ends thereof.

8. A connecting link according to claim 5, in which said first passage means is approximately longitudinally axially aligned with said pin means.

9. A connecting link according to claim 5, in which the surfaces of said tire-engaging section which define said first passage means are inclined to the longitudinal central plane of said connecting link.

10. A connecting link according to claim 5, in which said pin means is at one side thereof supported over its entire length.

11. A connecting link according to claim 5, in which those surface portions of said insert member which are located in said opening and respectively face said end portions are convexly curved.

12. A connecting link according to claim 5, in which said pin means is press fitted in said second passage means.

13. A connecting link according to claim 12, in which said pin means for closure is journaled in the running surface of said connecting link.